United States Patent
Montgomery et al.

(10) Patent No.: US 12,510,011 B2
(45) Date of Patent: Dec. 30, 2025

(54) SYSTEMS AND METHODS FOR MANAGING THE TEMPERATURE OF AN AFTERTREATMENT SYSTEM

(71) Applicant: Caterpillar Inc., Peoria, IL (US)

(72) Inventors: David T. Montgomery, Edelstein, IL (US); Jeff A. Howard, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/441,763

(22) Filed: Feb. 14, 2024

(65) Prior Publication Data
US 2025/0257676 A1   Aug. 14, 2025

(51) Int. Cl.
 *F01N 3/20*   (2006.01)
(52) U.S. Cl.
 CPC ......... *F01N 3/2033* (2013.01); *F01N 3/2026* (2013.01); *F01N 2560/06* (2013.01)
(58) Field of Classification Search
 CPC ...... F01N 3/2033; F01N 3/2026; F01N 3/035; F01N 3/2013; F01N 3/2006; F01N 3/2889; F01N 3/02; F01N 5/02; F01N 9/00; F01N 13/14; F01N 13/141; F01N 2560/06; F01N 2240/14; F01N 2240/16; F01N 2240/02; B01D 53/94; B01D 53/944; B01D 2255/1021; B01D 77/11; Y02A 50/20; Y02B 30/56; Y02T 10/12; Y02T 10/40
 See application file for complete search history.

(56) References Cited

U.S. PATENT DOCUMENTS

| | | | |
|---|---|---|---|
| 5,768,888 A | 6/1998 | Matros et al. | |
| 5,829,248 A * | 11/1998 | Clifton | F01N 3/26 60/303 |
| 5,943,859 A | 8/1999 | Kawamura | |
| 6,079,373 A | 6/2000 | Kawamura | |
| 7,210,467 B2 | 5/2007 | Kweon et al. | |
| 7,797,928 B2 | 9/2010 | Friedrich et al. | |
| 10,697,630 B1 | 6/2020 | Prabhu | |
| 11,433,352 B1 | 9/2022 | Prabhu | |
| 2004/0211182 A1 | 10/2004 | Gould | |
| 2008/0083215 A1 * | 4/2008 | Yan | F01N 3/025 60/297 |
| 2016/0097305 A1 | 4/2016 | Dane | |
| 2020/0232359 A1 * | 7/2020 | Kaack | F01N 11/002 |
| 2021/0372310 A1 * | 12/2021 | Bare | F01N 9/00 |

FOREIGN PATENT DOCUMENTS

| | | |
|---|---|---|
| CN | 212563412 U | 2/2021 |
| JP | 2001227330 A | 8/2001 |

* cited by examiner

*Primary Examiner* — Dapinder Singh
(74) *Attorney, Agent, or Firm* — Bookoff McAndrews PLLC

(57) ABSTRACT

An aftertreatment temperature management system includes: an engine operative to combust a fuel; an aftertreatment system including an oxidation catalyst and operative to receive exhaust produced by the engine; a heat exchanger coupled to the aftertreatment system and operative to exchange heat between exhaust downstream of the oxidation catalyst and exhaust upstream of the oxidation catalyst; and an insulation at least partially enclosing the heat exchanger and the oxidation catalyst.

20 Claims, 5 Drawing Sheets

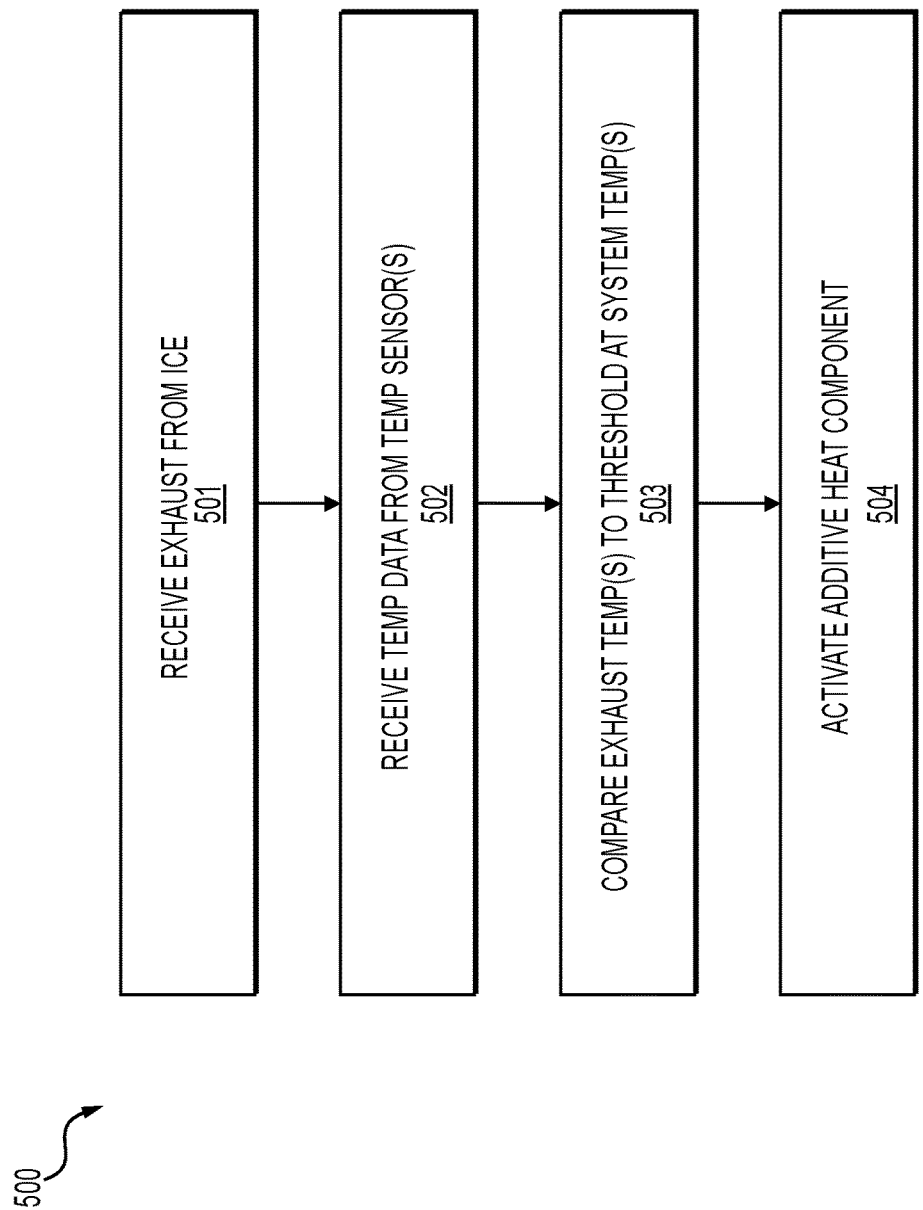

SYSTEMS AND METHODS FOR MANAGING THE TEMPERATURE OF AN AFTERTREATMENT SYSTEM

TECHNICAL FIELD

The present disclosure relates generally to aftertreatment systems, and more particularly, to methods and systems for controlling the temperature of an aftertreatment system.

BACKGROUND

Internal combustion engines that generate at least part of the energy for operating a machine are subjected to various regulations regarding the type and/or amount of emissions emitted by the internal combustion engine. For example, some regulations set a limit on the amount of gaseous emissions, such as methane ($CH_4$), carbon dioxide ($CO_2$), ammonia ($NH_3$), or nitrogen oxides (NOx), and/or the amount of particulate emissions from the internal combustion engine. To this end, some internal combustion engines include an aftertreatment system that processes the exhaust produced by the internal combustion engine to reduce the amount of undesirable compounds included therein.

Aftertreatment systems often include one or more oxidation catalysts for oxidizing constituents of gaseous emissions into less harmful compounds. For example, an aftertreatment system may include an oxidation catalyst for oxidizing carbon monoxide into carbon dioxide or a methane oxidation catalyst for oxidizing methane into carbon dioxide. Oxidation catalysts are generally more efficient and less susceptible to sulfur poisoning at higher temperatures, but an aftertreatment system may be damaged if a temperature within the aftertreatment system becomes too high. Thus, the temperature(s) within an aftertreatment system should be carefully managed in order to optimize the efficiency of the oxidation catalyst(s) included in the aftertreatment system without compromising the health and safety of the aftertreatment system. Further, aftertreatment systems for gaseous fuel engines can take a relatively long period of time to warm, especially when operating with a lean air to fuel mixture.

Chinese patent number CN212563412U, granted to Jie et al. on Feb. 19, 2021 ("the '412 patent"), describes a method for purifying exhaust gases with the use of a heat exchanger. The '412 patent does not disclose, for example, activating and deactivating one or more additive heat components to manage a temperature of an aftertreatment system in response to increases and decreases to the temperature of the aftertreatment system.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In one aspect, an aftertreatment temperature management system includes: an engine operative to combust a fuel; an aftertreatment system including an oxidation catalyst and operative to receive exhaust produced by the engine; a heat exchanger coupled to the aftertreatment system and operative to exchange heat between exhaust downstream of the oxidation catalyst and exhaust upstream of the oxidation catalyst; and an insulation at least partially enclosing the heat exchanger and the oxidation catalyst.

In another aspect, an aftertreatment temperature management system includes: an engine operative to combust a fuel; an aftertreatment system including an oxidation catalyst and operative to receive exhaust produced by the engine; a heat exchanger coupled to the aftertreatment system and operative to exchange heat between exhaust downstream of the oxidation catalyst and exhaust upstream of the oxidation catalyst; an additive heat component operative to add heat to the aftertreatment system; a temperature sensor operative to sense a temperature of the aftertreatment system; and a controller coupled to the additive heat component and operative to: monitor the temperature of the aftertreatment system sensed by the temperature sensor; and activate and deactivate the additive heat component in response to increases and decreases of the temperature of the aftertreatment system.

In another aspect, a method for managing the temperature of an aftertreatment system includes: receiving exhaust from an engine operative to combust a fuel, the exhaust being received by an aftertreatment temperature management system including an aftertreatment system and a heat exchanger operative to increase a temperature of the exhaust; determining the temperature of the exhaust; comparing the temperature of the exhaust to a threshold aftertreatment system temperature; and activating an additive heat component operative to add heat to the aftertreatment system in response to the temperature of the exhaust being lower than the threshold aftertreatment system temperature.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts a flowchart of a method associated with an aftertreatment temperature management system.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of +10% in the stated value.

Figure 1:
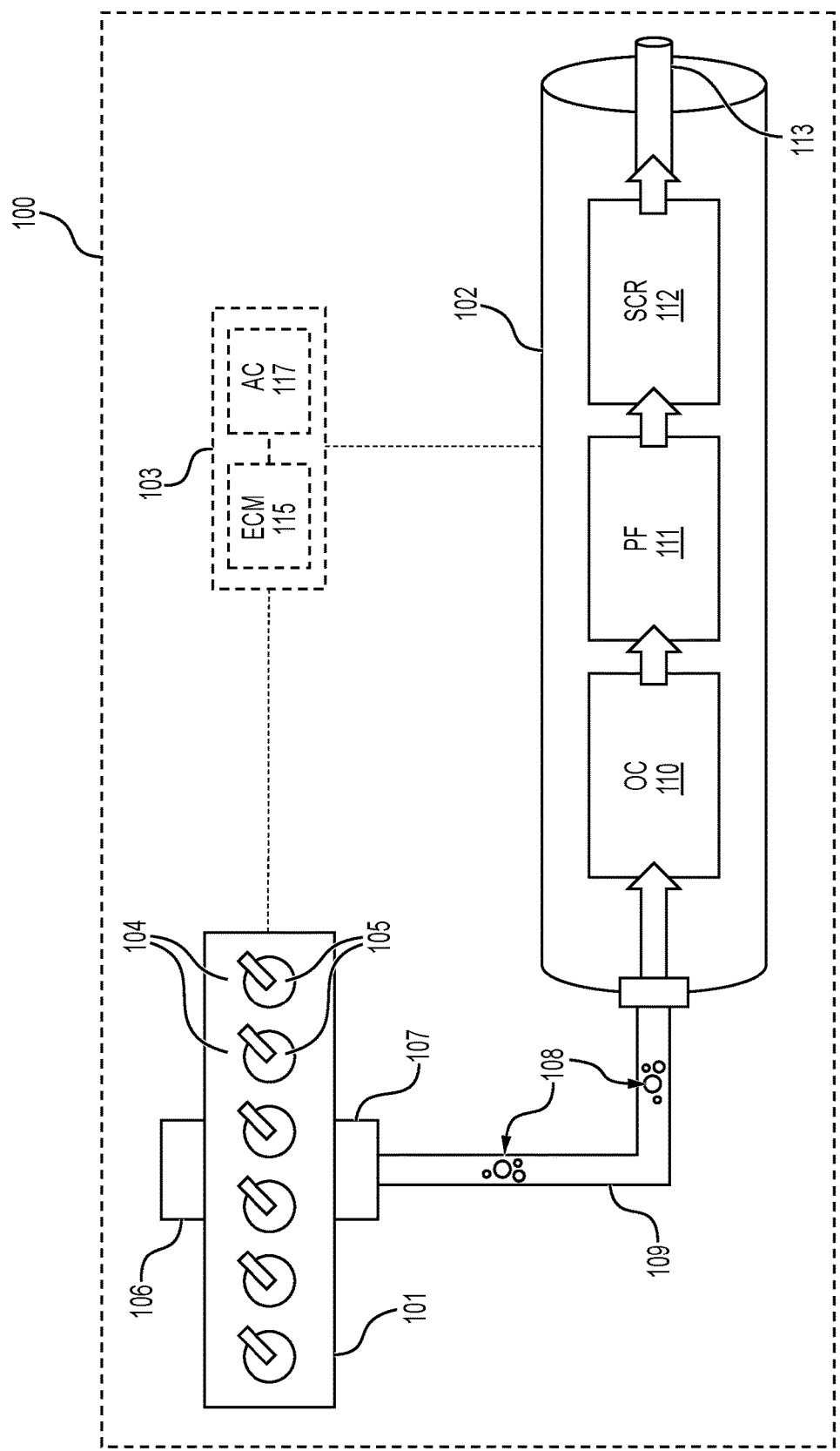
FIG. 1 depicts a schematic diagram of a machine including an internal combustion engine, an aftertreatment system, and one or more controllers.

FIG. 1 depicts a schematic diagram of a machine 100 that includes an internal combustion engine 101, an aftertreatment system 102, and one or more controllers 103. The machine 100 may also include an aftertreatment temperature management system 200 (FIG. 2), which may include one or more components of the internal combustion engine 101, the aftertreatment system 102, or the one or more controllers 103. Machine 100 may be configured to perform various operations associated with mining, earthmoving, paving, construction, farming, transportation, power generation, or other activities. For example, machine 100 may be a mobile machine, such as an on-highway vocational vehicle, an off-highway haul truck, an excavator, a dozer, a loader, a motor grader, paving machine, drilling machine or any other suitable mobile machine. Or, for example, machine 100 may be a stationary machine, such as a generator set, a furnace, or any other suitable stationary machine.

In general, internal combustion engine (ICE) 101 functions to receive a fuel, such as natural gas, combust the fuel, and output mechanical power. While the present disclosure discusses instances in which the ICE 101 is configured to combust gaseous fuel (e.g., natural gas, methane, butane, propane, hydrogen, biogas, etc.), it should be understood that the ICE 101 may be configured to combust other types of fuels, such as liquid fuel (e.g., gasoline or diesel fuel), either alone or in a dual fuel system that also combusts gaseous fuel. As depicted in FIG. 1, in some instances, ICE 101 includes a plurality of components or subsystems, such as a plurality of cylinders 104, a respective plurality of fuel injectors and/or gaseous fuel admission valves (collectively referred to as admission valves 105), an intake manifold 106, and an exhaust manifold 107. ICE 101 may also include an exhaust gas recirculation system (not shown). Although the ICE 101 is depicted with six cylinders 104, it should be understood that the ICE 101 may include any number of cylinders 104, e.g., twenty or more cylinders 104.

The intake manifold 106 may receive air (e.g., compressed air), such as from an air intake or forced induction system (not shown), and gaseous fuel (e.g., natural gas), to create a mixture of air and fuel. The mixture of air and fuel may be stoichiometric at least some of the time or lean at least some of the time. The mixture of air and fuel may then be delivered to a cylinder 104 downstream of admission valve 105. The mixture of air and fuel is then ignited, e.g., using a spark plug or by compression ignition of diesel fuel, causing combustion that can then be converted into mechanical power, such as by driving a piston disposed within the cylinder 104 to turn a crankshaft (not shown). The product(s) 108 of the combustion of the air and fuel mixture (hereinafter, "exhaust") may then be expelled from the cylinder 104, collected by the exhaust manifold 107, and delivered to the aftertreatment system 102, such as via an exhaust passage 109. In some instances, the ICE 101 also includes a turbocharger (not shown). The turbocharger includes a turbine downstream of the ICE 101 and a compressor upstream of the ICE 101. The turbine captures energy in the exhaust 108 and uses the energy to drive the compressor, which in turn increases the pressure and flow of air through the intake manifold 106.

As depicted in FIG. 1, in some instances, an aftertreatment system 102 includes a plurality of components or subsystems, such as an oxidation catalyst (OC) 110 (e.g., a methane oxidation catalyst), a particulate filter (PF) 111, and a selective catalytic reduction (SCR) system 112. The OC 110 may be disposed downstream of exhaust manifold 107 and upstream of both PF 111 and SCR 112. The PF 111 may be disposed downstream of OC 110 and upstream of SCR 112. When exhaust 108 is delivered from the ICE 101 to the aftertreatment system 102, the exhaust 108 is first passed through the OC 110, where harmful or undesired emissions such as methane and carbon monoxide in the exhaust 108 are oxidized into carbon dioxide and water. Next, the exhaust 108 is passed through the PF 111, where solid particles (e.g., carbon particulates) in the exhaust 108 are trapped before they can exit the machine 100. Finally, the exhaust 108 is passed through an SCR system 112, where nitrogen oxides in the exhaust 108 are reduced into nitrogen before they exit the machine 100. After the exhaust 108 has been passed through the OC 110, the PF 111, and the SCR 112, the remaining exhaust 108 (containing, e.g., carbon dioxide, water, and nitrogen) may be safely emitted from the machine 100, such as through an exhaust pipe 113. It should be understood that these components of an aftertreatment system 102 are exemplary only, and that additional and/or different components may be included in various instances depending on the configuration of the machine 100. For example, an aftertreatment system 102 may include an OC 110 and a PF 111 but may not include an SCR 112. Or for example, an aftertreatment system 102 may include a PF 111 and an SCR 112 but may not include an OC 110. Or for example, an aftertreatment system 102 may include only a PF 111. In some instances, a PF 111 may include or otherwise perform the function of an OC 110 (e.g., the PF 111 may be a catalyzed particle filter capable of oxidizing hydrocarbons and/or carbon monoxide included in the exhaust 108 and trapping solid particles included in the exhaust 108). The relative location of each component of the aftertreatment system 102 may be changed without limiting the scope of the present disclosure.

As mentioned above, operation of the aftertreatment system 102 may be improved when the temperature(s) of the aftertreatment system 102 are managed. If the operating temperature of an oxidation catalyst (OC) 110 included in the aftertreatment system 102 is too low, one or more components of the aftertreatment system 102, e.g., OC 110, may not function as efficiently as possible, or may be more susceptible to sulfur poisoning. However, if a temperature of the aftertreatment system 102 is too high, the aftertreatment system 102 may be damaged.

Figure 2:
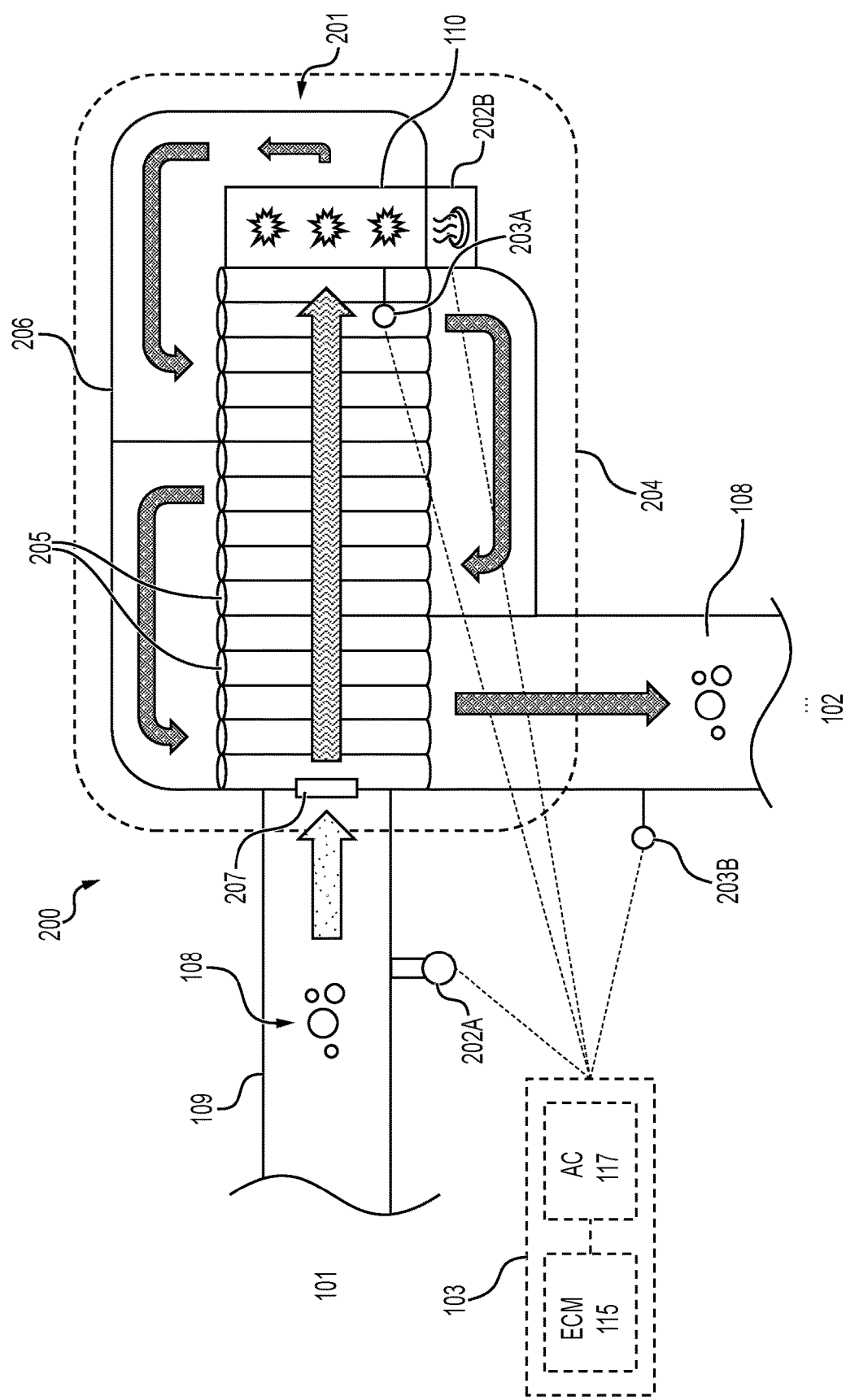
FIG. 2 depicts a schematic diagram of an aftertreatment temperature management system including a heat exchanger.

FIG. 2 depicts a schematic diagram of an aftertreatment temperature management system (TMS) 200. As depicted in FIG. 2, a TMS 200 may include the ICE 101, aftertreatment system 102, and a heat exchanger 201. In some instances, the TMS 200 includes one or more controllers 103, one or more additive heat components (e.g., additive heat component 202A or 202B), one or more temperature sensors (e.g., temperature sensor 203A or 203B), or an insulation 204, which may include one or more insulation layers that surround one or more components of the aftertreatment system 102 and/or the TMS 200. In general, the components of the TMS 200 function cooperatively to manage the temperature of the aftertreatment system 102.

Figure 3B:
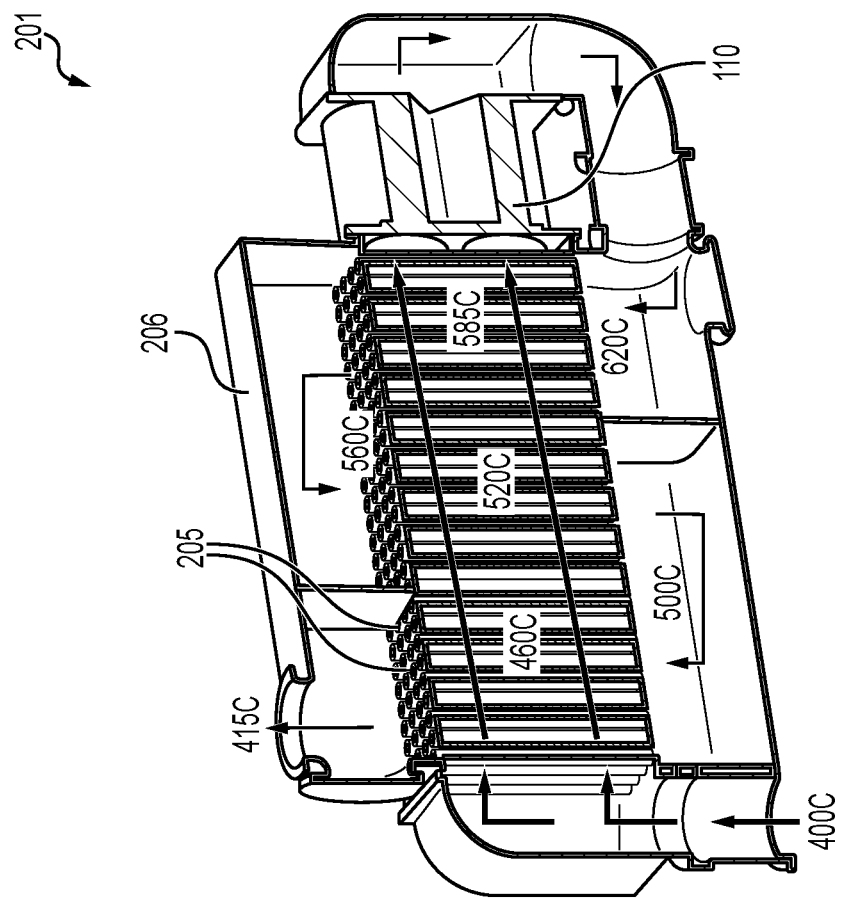
FIGS. 3A and 3B illustrate a heat exchanger included in the aftertreatment temperature management system of FIG. 2.

The temperature(s) of an aftertreatment system 102 are dynamic and may vary considerably from one location within the aftertreatment system 102 to another. As mentioned above, when exhaust 108 from the ICE 101 is received by the aftertreatment system 102, the exhaust 108 is typically exposed to an oxidation catalyst (OC) 110, at which one or more components of the exhaust 108 may be oxidized in a chemical reaction that produces heat, e.g., an exothermic reaction. Thus, the temperature of the exhaust 108 upstream of the aftertreatment system 102 may be lower than the temperature of the exhaust 108 downstream of the OC 110 included in the aftertreatment system 102. For example, as shown in FIG. 3B, the temperature of the exhaust 108 upstream of the aftertreatment system 102 may be ~400° C., and the temperature of the exhaust 108 downstream of the OC 110 may be ~500 or ~600° C. The temperature of the exhaust 108 upstream of the aftertreatment system 102 may be even less if the ICE 101 includes a turbocharger, which captures and uses energy from the exhaust 108 upstream of the aftertreatment system 102 to increase the pressure and flow of air through the intake manifold 106 of the ICE 101, as mentioned above. Because the operating temperature of an OC 110 is significantly impacted by the temperature of the exhaust 108 as the exhaust 108 is received by the OC 110 (e.g., the temperature of the exhaust 108 upstream of the aftertreatment system 102), the lower the temperature of the exhaust 108 upstream of the OC 110 is, the less efficient the OC 110 will operate, and the more susceptible the OC 110 will be to sulfur poisoning.

In some instances, to increase the temperature of the exhaust 108 upstream of an OC 110 included in an aftertreatment system 102, the TMS 200 includes a heat exchanger 201. Heat exchanger 201 is operative to exchange heat between exhaust 108 downstream of the OC 110 and exhaust 108 upstream of the OC 110.

For example, as depicted in FIG. 2, heat exchanger 201 may be a shell-and-tube heat exchanger. The shell-and-tube heat exchanger 201 may include a shell 206 and a plurality of tubes 205. The shell 206 may be a pressure vessel that partially or completely surrounds the plurality of tubes 205. The shell 206 may be constructed out of carbon steel, stainless steel, or any other suitable material. The tubes 205 may be constructed out of copper, aluminum, stainless steel, or any other suitable material. The material(s) used to construct the shell 206 and tubes 205 may be selected based on the properties of the fluid medium(s) to be passed through the shell-and-tube heat exchanger 201, the desired or required corrosion resistance or heat transfer efficiency, or any other appropriate factor.

In a shell-and-tube heat exchanger 201, a first fluid of a first temperature flows through the tubes 205 of the heat exchanger 201 and a second fluid of a second temperature flows through the shell 206 of the heat exchanger 201, outside and around the tubes 205. Heat is transferred from the higher temperature fluid to the lower temperature fluid. In the example depicted in FIG. 2, the OC 110 is positioned within the heat exchanger 201, such that the heat exchanger 201 surrounds the OC 110. Exhaust 108 from the ICE 101 enters the heat exchanger 201 at a relatively cold temperature (represented by the lighter-patterned arrow in FIG. 2) and exits the OC 110 at a relatively hot temperature (represented by the darker-patterned arrows in FIG. 2), due to the oxidation reaction that occurs within the OC 110 (as described above), represented in FIG. 2 by explosion symbols.

The exhaust 108 downstream of the OC 110 is funneled through the tubes 205 of the heat exchanger 201 before the exhaust 108 exits the heat exchanger 201 and continues onto one or more components of the aftertreatment system 102 (e.g., a PF 111 or an SCR 112) or out of the machine 100, such as through an exhaust pipe 113. The exhaust 108 upstream of the OC 110 is funneled toward the OC 110 through the shell 206 of the heat exchanger 201, outside and around exterior surfaces of the tubes 205, absorbing heat from the exhaust 108 downstream of the OC 110 inside of the tubes 205 and increasing in temperature accordingly.

When the exhaust 108 upstream of the OC 110 is received by the OC 110, the exhaust 108 upstream of the OC 110 is warmer than it is when it is first received by the heat exchanger 201, thereby increasing the operating temperature, and, accordingly, the efficiency, of the OC 110.

Figure 3A:
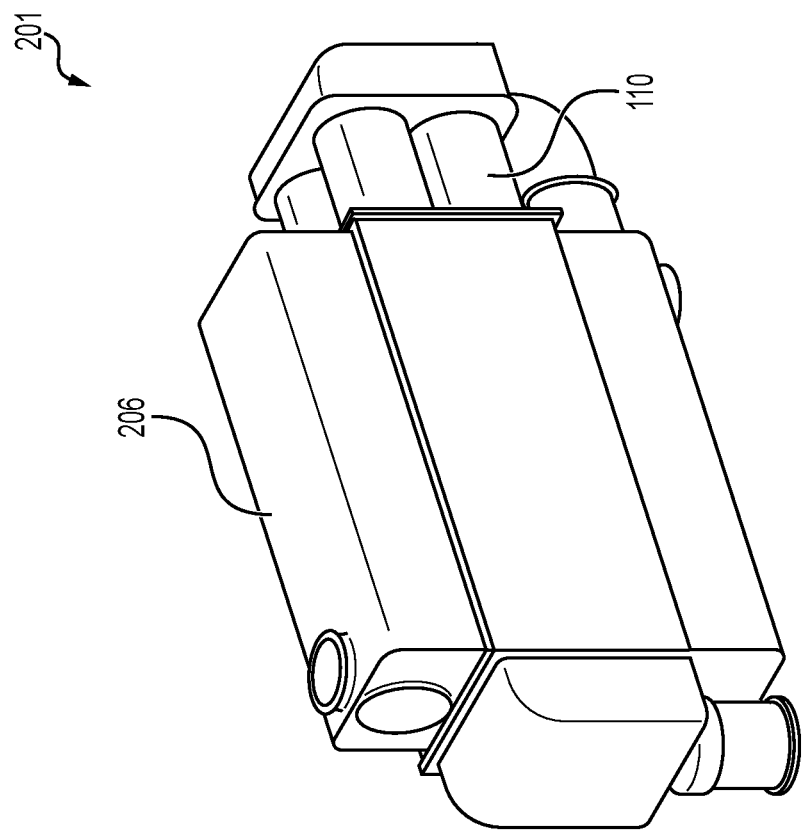

FIGS. 3A and 3B illustrate an example of the shell 206 and tubes 205 of a shell-and-tube heat exchanger 201 built to partially or completely surround an OC 110. In this example, the exhaust 108 is received by the heat exchanger 201 at an initial temperature of 400° C., and the exhaust 108 exits the OC 110 at a temperature of 620° C. Through the heat exchanger 201 (e.g., within the tubes 205), the exhaust 108 reaches a temperature of 585° C. before it is received by the OC 110.

Referring again to FIG. 2, as mentioned above, in some instances, the TMS 200 includes an insulation 204 that traps heat within the TMS 200, e.g., within the heat exchanger 201, to maximize the efficiency of the heat exchanger 201. For example, in some instances, the shell 206 of the shell-and-tube heat exchanger 201 is entirely covered or enclosed by one or more layers of insulation 204. For example, insulation 204 may surround inlet 207 of the heat exchanger 201, the heat exchanger 201 itself (e.g., the shell 206 in which the tubes 205 are secured), and the oxidation catalyst 110. In some instances, insulation 204 is built into the shell 206 of the shell-and-tube heat exchanger 201. The insulation 204 may be composed of rock fiber or other suitable materials. While the heat exchanger 201 is generally depicted and described herein as a shell-and-tube heat exchanger, it should be understood that the heat exchanger 201 may embody any other suitable form. For example, in some instances, the heat exchanger 201 is a primary-surface heat exchanger, such as a micro-channel heat exchanger. The primary-surface heat exchanger may be composed of folded foil and/or 3D printed.

In some instances, the TMS 200 includes one or more additive heat components (e.g., additive heat component 202A or 202B) and one or more controllers 103, such as an electronic control module (ECM) 115 and/or an actuator controller (AC) 117, operatively coupled to the one or more additive heat components. For example, additive heat component 202A may be a duct burner disposed near or within the exhaust passage 109 and operative to generate and add heat to the exhaust 108 upstream of the aftertreatment system 102 by burning a fuel. Or for example, additive heat component 202B may be an electric heater (e.g., electric heating element(s) or electric grid) disposed near or within the OC 110 and operative to add heat to the aftertreatment system 102 near the OC 110 by generating heat using an electrical current. Or for example, an additive heat component may be a hydrocarbon fuel injector or gaseous fuel admission valve disposed near or within the OC 110 and operative to add heat to the aftertreatment system 102 by injecting or admitting fuel into exhaust 108 or the aftertreatment system 102 to be oxidized by the OC 110. The hydrocarbon fuel injector or gaseous fuel admission valve may be downstream of the ICE 101 and upstream of the OC 110. However, an additive heat component may be any device or system suitable to add heat to the aftertreatment system 102 and may be disposed anywhere within the aftertreatment system 102. In some instances, when fuel is injected into the exhaust 108 by an additive heat component (e.g., a hydrocarbon fuel injector or gaseous fuel admission valve), additional air may be injected into the exhaust 108 upstream of the aftertreatment system 102, such as by reversing the operation of a turbocharger (not shown), as described above. For example, after a stop condition (as described below), a bypass may be used to redirect air from upstream of the ICE 101 to the exhaust passage 109 when a hydrocarbon fuel injector or gaseous fuel admission valve is used to inject or admit fuel into the exhaust passage 109.

Figure 4:
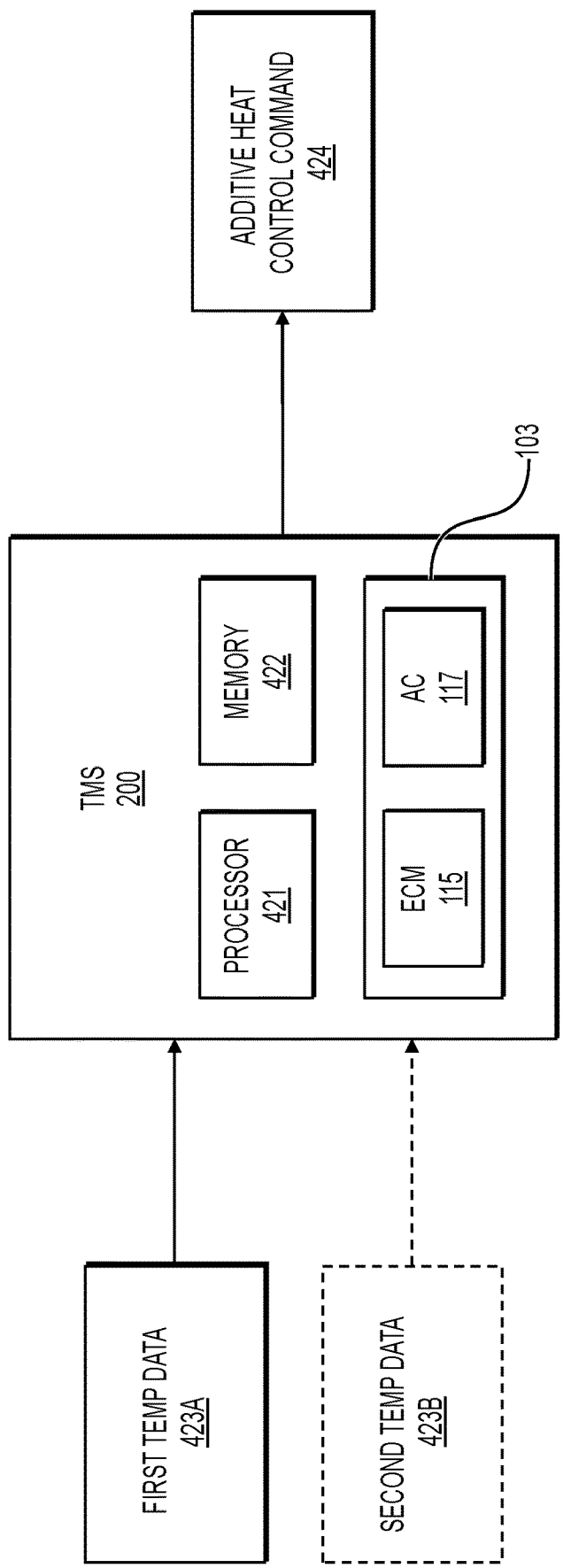
FIG. 4 depicts a block diagram of an aftertreatment temperature management system for managing the temperature of an aftertreatment system.

FIG. 4 depicts a block diagram of the aftertreatment temperature management system (TMS) 200. In general, TMS 200 includes an aftertreatment system 102 and one or more components or systems suitable for monitoring and/or increasing one or more temperatures within the aftertreatment system 102, such as one or more controllers 103, one or more additive heat components, and one or more temperature sensors. In some instances, the one or more controllers 103 are communicatively coupled. In some instances, the electronic control module (ECM) 115 and the actuator controller (AC) 117 are two parts of a single controller 103. As used herein, the term "controller" includes both single controllers and multiple controllers. One or more controllers 103, such as ECM 115, may be executed on a processor 421. One or more controllers 103, such as ECM 115, may be operative to execute instructions stored on a memory 422. AC 117 may be operatively coupled to one or more actuators, such as one or more additive heat components.

In some instances, the one or more controllers 103 can generate commands to activate the one or more additive heat components to increase a temperature within the aftertreatment system 102 and thereby increase the operating temperature of the OC 110. For example, in some instances, when the ICE 101 is operated following a stop condition (e.g., during a cold start), there is no exhaust 108 downstream of the OC 110, and therefore the heat exchanger 201 may not be configured to immediately increase the temperature of the exhaust 108 upstream of the OC 110. In such an instance, a controller 103, such as actuator controller 117, may be configured to automatically, and temporarily, activate a duct burner disposed near or within the exhaust passage 109 (e.g., additive heat component 202A) for a predetermined amount of time when the ICE 101 is first operated following a stop condition, to increase the temperature of the exhaust 108 upstream of the OC 110 or otherwise increase the operating temperature of the OC 110. For example, when the ICE 101 is operated following a stop condition, the actuator controller 103 may be configured to automatically and temporarily activate the duct burner for one minute, five minutes, one hour, or longer.

Or for example, in some instances, the one or more controllers 103 can activate and/or deactivate the one or more additive heat components based on temperature data generated by the one or more temperature sensors. For example, in some instances, the TMS 200 includes a single temperature sensor 203A disposed near or within the heat exchanger 201, upstream of the OC 110, and operative to determine the temperature of the exhaust 108 upstream of the OC 110, e.g., the temperature of the exhaust 108 just before the exhaust 108 is received by the OC 110. Temperature sensor 203A may be an air charge temperature (ACT) sensor. The temperature sensor 203A may generate and provide, e.g., on an ongoing basis, first temperature data 423A representing the temperature of the exhaust 108 upstream of the OC 110 to a controller 103, such as electronic control module (ECM) 115. In such an instance, ECM 115 may be operative to monitor, using the first temperature data 423A generated by the temperature sensor 203A, the temperature of the exhaust 108 upstream of the OC 110 (e.g., exhaust 108 inside of the heat exchanger 201 immediately upstream of OC 110). If the temperature of the exhaust 108 upstream of the OC 110 is below a threshold upstream temperature, or if the temperature of the exhaust 108 upstream of the OC 110 remains below the threshold upstream temperature for a threshold duration of time, one or more controllers 103, e.g., ECM 115 or AC 117, functioning separately or cooperatively, may activate one or more additive heat components to increase the temperature of the exhaust 108 upstream of the OC 110 or otherwise increase the operating temperature of the OC 110, such as by generating an additive heat control command 424 and transmitting the additive heat control command 424 to AC 117.

In some instances, one or more controllers 103 of the TMS 200 are operative to activate one or more additive heat components based on temperature data generated by a plurality of temperature sensors. For example, in some instances, the TMS 200 includes a first temperature sensor 203A disposed near or within the heat exchanger 201 and upstream of the OC 110 and a second temperature sensor 203B disposed near or within the heat exchanger 201 and downstream of the OC 110. The first temperature sensor 203A is operative to determine the temperature of the exhaust 108 upstream of the OC 110, and the second temperature sensor 203B is operative to determine the temperature of the exhaust 108 downstream of the OC 110. The first temperature sensor 203A may generate, e.g., on an ongoing basis, first temperature data 423A representing the temperature of the exhaust 108 upstream of the OC 110, and the second temperature sensor 203B may generate, e.g., on an ongoing basis, second temperature data 423B representing the temperature of the exhaust 108 downstream of the OC 110 and/or downstream of the heat exchanger 201. The first and second temperature data 423A and 423B may be provided to a controller 103, such as ECM 115, with which the controller 103 may monitor the temperature of the exhaust 108 upstream of the OC 110 and the temperature of the exhaust 108 downstream of the OC 110. If the temperature of the exhaust 108 is below a threshold upstream temperature, of if the temperature of the exhaust 108 remains below the threshold upstream temperature for a threshold duration of time, and if the temperature of the exhaust 108 downstream of the OC 110 is below a threshold downstream temperature, the one or more controllers 103 may activate one or more additive heat components to increase the temperature of the exhaust 108 upstream of the OC 110 or otherwise increase the operating temperature of the OC 110, such as by generating an additive heat control command 424 and transmitting the additive heat control command 424 to AC 117. However, if the temperature of the exhaust 108 downstream of the OC 110 is above the threshold downstream temperature, the one or more controllers 103 may not activate one or more additive heat components, to increase efficiency and prevent overheating. Both the threshold upstream temperature and the threshold downstream temperature may be referred to as "threshold aftertreatment system temperatures." However, the TMS 200 may include any number of temperature sensors, and the one or more controllers 103 may activate one or more additive heat components based on any number of threshold aftertreatment system temperatures, or without considering any threshold aftertreatment system temperatures.

In some instances, when the one or more controllers 103 activate one or more additive heat components to increase a temperature of the aftertreatment system 102, such as the temperature of the exhaust 108 upstream of an OC 110 or the operating temperature of the OC 110, the one or more controllers 103 activate the one or more additive heat components for a predetermined amount of time, such as one minute, five minutes, one hour, or longer. In some instances, when the one or more controllers 103 activate an additive heat component to increase a temperature of the aftertreatment system 102, the one or more controllers 103 activate the additive heat component until the temperature of the aftertreatment system 102 reaches a target or threshold temperature. In some instances, after activating one or more additive heat components to increase a temperature of an aftertreatment system 102, the one or more controllers 103 deactivate the one or more additive heat components when the temperature of aftertreatment system 102 reaches a target or threshold temperature. In this way, the TMS 200 can manage the temperature of an aftertreatment system 102 by activating and deactivating one or more additive heat components in response to increases and decreases of the temperature of the aftertreatment system 102.

INDUSTRIAL APPLICABILITY

The disclosed aspects of the present disclosure may be applied to a variety of engines, and machines and/or vehicles that incorporate these engines to generate power to move the machine, power an implement, generate electricity, etc. For example, the aftertreatment temperature management system of the present disclosure may increase the efficiency and sustainability of oxidation catalysts used in aftertreatment systems of machines that include internal combustion engines.

As described above, an ICE 101 of a machine 100 combusts fuel, such as natural gas, to produce mechanical power that can be used by the machine 100 to move or perform other work, such as generating electricity. The combustion of fuel within the ICE 101 produces exhaust 108 that may include harmful or undesirable emissions. These emissions may be reduced or eliminated by an aftertreatment system 102 operatively coupled to the ICE 101. The efficiency of one or more components of the aftertreatment system 102, such as an oxidation catalyst (OC) 110, may generally increase at higher temperatures, but the aftertreatment system 102 may be damaged if a temperature of the aftertreatment system 102 becomes too high. The aftertreatment temperature management system (TMS) 200 may include a heat exchanger 201 that is operative to exchange heat between exhaust 108 downstream of an OC 110 included in the aftertreatment system 102 and exhaust 108 upstream of the OC 110, thereby increasing the temperature of the exhaust 108 upstream of the OC 110 and ultimately increasing the operating temperature of the OC 110 as well. One or more components of the TMS 200, such as the heat exchanger 201 and the OC 110, may be insulated to retain heat and minimize the amount of time that additive heat components 202A and 202B are activated. In some configurations, the insulation 204 may be facilitate the omission additive heat components (e.g., allowing the omission of a duct burner in the TMS 200). The TMS 200 may additionally or alternatively include one or more additive heat components, one or more temperatures sensors, and/or one or more controllers 103 operatively coupled to the one or more additive heat components and/or the one or more temperature sensors. The one or more controllers 103 may be operative to activate or deactivate the one or more additive heat components automatically or based on temperature data generated by the one or more temperature sensors, such that the operating temperature of the OC 110 reaches a more optimal temperature.

FIG. 5 depicts a flowchart of a method 500 associated with an aftertreatment temperature management system (TMS) 200. In some instances, as depicted in FIG. 5, the method 500 begins with step 501, in which a TMS 200, e.g., an aftertreatment system 102 included in the TMS 200, receives exhaust 108 generated by an ICE 101. The exhaust 108 is received by the TMS 200 at an initial temperature, which may be lower than an optimal operating temperature (e.g., a light-off temperature) of an oxidation catalyst (OC) 110 included in the aftertreatment system 102. For example, the exhaust 108 generated by the ICE 101 and received by the TMS 200 may have an initial temperature of 400° C., and the optimal operating temperature of the OC 110 may be 550° C. The TMS 200 may include a heat exchanger 201 configured to exchange heat between exhaust 108 downstream of the OC 110 and exhaust 108 upstream of the OC 110, thereby increasing the temperature of the exhaust 108 upstream of the OC 110, as described above. However, in some instances, the heat exchanger 201 may not be capable of increasing the temperature of the exhaust 108 to the optimal operating temperature of the OC 110, such as after a stop condition, as described above.

In some instances, after the TMS 200 receives exhaust 108 generated by an ICE 101, the method 500 continues with step 502, in which the TMS 200 receives temperature data representing one or more temperatures of the exhaust 108 from one or more temperature sensors. For example, the TMS 200 may include a first temperature sensor 203A disposed near or within the aftertreatment system 102 and upstream of the OC 110. The temperature sensor 203A can generate and provide to the TMS 200, on an ongoing basis, temperature data 423A representing the temperature of the exhaust 108 upstream of the OC 110. Or for example, the TMS 200 may include a first temperature sensor 203A disposed near or within the aftertreatment system 102 and upstream of the OC 110 and a second temperature sensor 203B disposed near or within the aftertreatment system 102 and downstream of the OC 110. The first temperature sensor 203A can generate and provide to the TMS 200, on an ongoing basis, temperature data 423A representing the temperature of the exhaust 108 upstream of the OC 110, and the second temperature sensor 203B can generate and provide to the TMS 200, on an ongoing basis, temperature data 423B representing the temperature of the exhaust 108 downstream of the OC 110.

In some instances, after the TMS 200 receives temperature data representing one or more temperatures of the exhaust 108, the method 500 continues with steps 503 and 504, in which the TMS 200 compares the one or more temperatures of the exhaust 108 to one or more threshold aftertreatment system temperatures and, if appropriate, activates one or more additive heat components, respectively. For example, the TMS 200 may compare a temperature of the exhaust 108 upstream of the OC 110 to a threshold upstream temperature. In this example, if the TMS 200 determines that the temperature of the exhaust upstream of the OC 110 is below the threshold upstream temperature, the TMS 200 may activate one or more additive heat components, such as a duct burner or an electric heating grid, to increase the temperature of the exhaust 108 upstream of the OC 110 or otherwise increase the operating temperature of the OC 110. Or for example, the TMS 200 may compare a temperature of the exhaust 108 upstream of the OC 110 to a threshold upstream temperature and compare a temperature of the exhaust 108 downstream of the OC 110 to a threshold downstream temperature. In this example, if the TMS 200 determines that the temperature of the OC 110 upstream of the OC 110 is below the threshold upstream temperature, and that the temperature of the OC 110 downstream of the OC 110 is below the threshold downstream temperature, the TMS 200 may activate one or more additive heat components, such as a duct burner or an electric heating grid, to increase the temperature of the exhaust 108 upstream of the OC 110 or otherwise increase the operating temperature of the OC 110. However, in this example, if the TMS 200 determines that the temperature of the exhaust 108 downstream of the OC 110 is above the threshold downstream temperature, the TMS 200 may not activate one or more additive heat components, for efficiency and to protect the aftertreatment system 102 from overheating.

By including a heat exchanger 201 in an aftertreatment system 102, as described above, the TMS 200 can efficiently increase the temperature of exhaust 108 upstream of an OC 110 included in the aftertreatment system 102, thereby increasing the operating temperature and, by extension, the efficiency and sustainability of the OC 110. One or more components of the TMS 200, such as the heat exchanger 201 and the OC 110, may be partially or completely enclosed by an insulation layer 204, to further increase the efficiency of the aftertreatment system 102. By including one or more additive heat components that may be activated or deactivated based on one or more temperatures of the aftertreatment system 102, as described above, the TMS 200 can increase the temperature of the exhaust 108 upstream of the OC 110 or otherwise increase the operating temperature of the OC 110 when the temperature of the exhaust 108 upstream of the OC 110 or the operating temperature of the OC 110 is less than an optimal temperature, and prevent the aftertreatment system 102 from reaching a temperature at which the aftertreatment system 102 may be at risk of damage. In at least these ways, the TMS 200 manages the temperature of the aftertreatment system 102 to increase the efficiency of the aftertreatment system 102 while protecting the aftertreatment system 102 from damage.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. An aftertreatment temperature management system comprising:
    an engine operative to combust a fuel;
    an aftertreatment system including an oxidation catalyst and operative to receive exhaust produced by the engine;
    a heat exchanger coupled to the aftertreatment system and operative to exchange heat between exhaust downstream of the oxidation catalyst and exhaust upstream of the oxidation catalyst, the heat exchanger including a shell and a plurality of tubes; and
    an insulation at least partially enclosing the heat exchanger and the oxidation catalyst, wherein the insulation entirely surrounds the tubes of the heat exchanger.

2. The aftertreatment temperature management system of claim 1, wherein the insulation at least partially surrounds an inlet of the heat exchanger and the oxidation catalyst.

3. The aftertreatment temperature management system of claim 1, wherein the plurality of tubes of the heat exchanger is surrounded by the shell.

4. The aftertreatment temperature management system of claim 1, further comprising:
    an additive heat component operative to add heat to the aftertreatment system; and
    a controller operatively coupled to the additive heat component and operative to generate commands to activate the additive heat component.

5. The aftertreatment temperature management system of claim 4, wherein the additive heat component is a duct burner.

6. The aftertreatment temperature management system of claim 4, wherein the additive heat component is an electric heater.

7. The aftertreatment temperature management system of claim 4, wherein the additive heat component is a hydrocarbon fuel injector or a gaseous fuel admission valve.

8. The aftertreatment temperature management system of claim 7, wherein the hydrocarbon fuel injector or the gaseous fuel admission valve is downstream of the engine and upstream of the oxidation catalyst.

9. The aftertreatment temperature management system of claim 4, further comprising a temperature sensor communicatively coupled to the controller and operative to determine the temperature of the aftertreatment system.

10. The aftertreatment temperature management system of claim 9, wherein the controller is further operative to compare the temperature of the aftertreatment system to a threshold aftertreatment system temperature and activate the additive heat component in response to the temperature of the aftertreatment system being below the threshold aftertreatment system temperature.

11. The aftertreatment temperature management system of claim 9, wherein the controller is further operative to monitor the temperature of the aftertreatment system and activate and deactivate the additive heat component in response to increases and decreases of the temperature of the aftertreatment system.

12. The aftertreatment temperature management system of claim 1, further comprising:
    an additive heat component operative to add heat to the aftertreatment system;
    a first temperature sensor operative to determine a first temperature of the aftertreatment system upstream of the oxidation catalyst;
    a second temperature sensor operative to determine a second temperature of the aftertreatment system downstream of the oxidation catalyst; and
    a controller coupled to the additive heat component, the first temperature sensor, and the second temperature sensor and operative to activate and deactivate the additive heat component based on the first and second temperatures of the aftertreatment system.

13. An aftertreatment temperature management system comprising:
    an engine operative to combust a fuel;
    an aftertreatment system including an oxidation catalyst and operative to receive exhaust produced by the engine;
    a heat exchanger coupled to the aftertreatment system and operative to exchange heat between exhaust downstream of the oxidation catalyst and exhaust upstream of the oxidation catalyst;
    an additive heat component operative to add heat to the aftertreatment system, the additive heat component including a hydrogen fuel injector or a gaseous fuel admission valve positioned upstream of the oxidation catalyst and positioned external to the heat exchanger;

a temperature sensor operative to sense a temperature of the aftertreatment system; and a controller coupled to the additive heat component and operative to:

monitor the temperature of the aftertreatment system sensed by the temperature sensor; and activate and deactivate the additive heat component in response to increases and decreases of the temperature of the aftertreatment system.

14. The aftertreatment temperature management system of claim 13, further including an insulation at least partially enclosing the heat exchanger and the oxidation catalyst.

15. The aftertreatment temperature management system of claim 13, wherein the heat exchanger is a shell-and-tube heat exchanger.

16. The aftertreatment temperature management system of claim 13, wherein the heat exchanger is a primary-surface heat exchanger.

17. The aftertreatment temperature management system of claim 13, wherein the additive heat component is a duct burner or an electric heater.

18. The aftertreatment temperature management system of claim 13, wherein the additive heat component is a hydrocarbon fuel injector or a gaseous fuel admission valve.

19. The aftertreatment temperature management system of claim 15, wherein the shell-and-tube heat exchanger includes a shell surrounding a plurality of tubes.

20. A method for managing the temperature of an aftertreatment system, the method comprising:

receiving exhaust from an engine operative to combust a fuel, the exhaust being received by an aftertreatment temperature management system including an aftertreatment system and a heat exchanger operative to increase a temperature of the exhaust, the heat exchanger including a shell surrounding a plurality of tubes;

determining the temperature of the exhaust;

comparing the temperature of the exhaust to a threshold aftertreatment system temperature; and activating an additive heat component operative to add heat to the aftertreatment system in response to the temperature of the exhaust being lower than the threshold aftertreatment system temperature.

* * * * *